(12) United States Patent
Oklejas, Jr.

(10) Patent No.: US 6,713,028 B1
(45) Date of Patent: Mar. 30, 2004

(54) ROTATING PROCESS CHAMBER WITH INTEGRAL PUMP AND ENERGY RECOVERY TURBINE

(75) Inventor: Eli Oklejas, Jr., Monroe, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 0 days.

(21) Appl. No.: 09/491,371

(22) Filed: Jan. 26, 2000

Related U.S. Application Data

(60) Provisional application No. 60/117,286, filed on Jan. 26, 1999.

(51) Int. Cl.[7] .............................. B01J 8/38; B01F 9/00; B01F 9/02
(52) U.S. Cl. ....................... 422/209; 422/224; 422/193; 422/197
(58) Field of Search ................ 422/209, 224, 422/193, 197

(56) References Cited

U.S. PATENT DOCUMENTS

| | | | |
|---|---|---|---|
| 4,187,173 A | 2/1980 | Keefer | |
| 4,230,564 A | 10/1980 | Keefer | |
| 4,255,081 A | 3/1981 | Oklejas et al. | |
| 4,353,874 A * | 10/1982 | Keller et al. | 422/193 |
| 4,432,876 A | 2/1984 | Keefer | |
| 4,830,572 A | 5/1989 | Oklejas et al. | |
| 4,966,708 A | 10/1990 | Oklejas et al. | |
| 4,973,408 A | 11/1990 | Keefer | |
| 4,983,305 A | 1/1991 | Oklejas et al. | |
| 4,997,357 A * | 3/1991 | Eirich et al. | 422/209 |
| 5,049,045 A | 9/1991 | Oklejas et al. | |
| 5,082,428 A | 1/1992 | Oklejas et al. | |
| 5,106,262 A | 4/1992 | Oklejas et al. | |
| 5,132,090 A * | 7/1992 | Volland | 422/201 |
| 5,819,524 A | 10/1998 | Bosley et al. | |
| 5,951,169 A | 9/1999 | Oklejas et al. | |
| 5,980,114 A | 11/1999 | Oklejas, Jr. | |
| 6,036,435 A | 3/2000 | Oklejas | |

* cited by examiner

Primary Examiner—Jerry D. Johnson
Assistant Examiner—Alexa A. Doroshenk
(74) Attorney, Agent, or Firm—Kevin G. Mierzwa

(57) ABSTRACT

A rotating process chamber assembly for processing various fluids comprises a substantially cylindrical process chamber has an outer wall extending between two end walls and a substantially cylindrical inner wall spaced radially inward from the outer wall in an axial direction. The outer wall and the inner wall define an annular reaction space therebetween. The housing has a central axis. The process chamber has an inlet located substantially coaxial with the central axial. The process chamber has an outlet located substantially axial with the central axis. A drive is coupled to the process chamber to rotate the housing about the central axis. A plurality of feed channels fluidically couples the inlet and the annular reaction space. A first plurality of product channels fluidically couples the annular reaction space to the outlet.

17 Claims, 4 Drawing Sheets

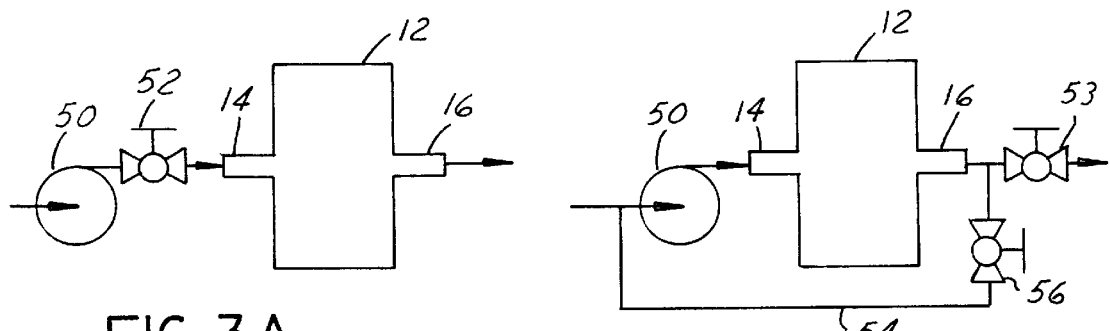
FIG. 3A
FIG. 3B
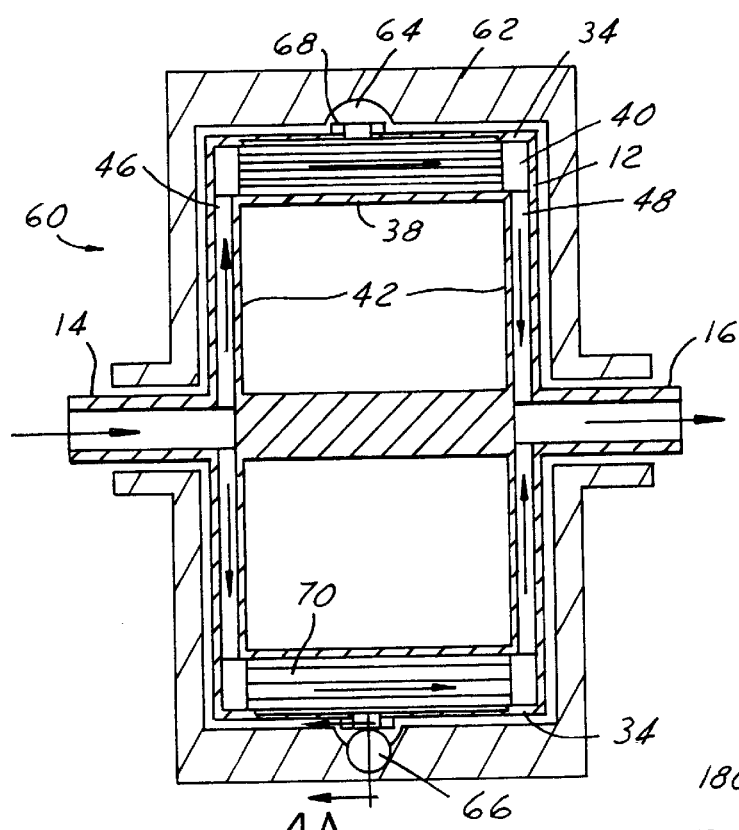
FIG. 4
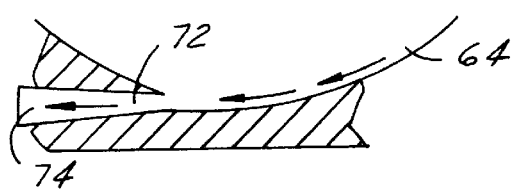
FIG. 4A
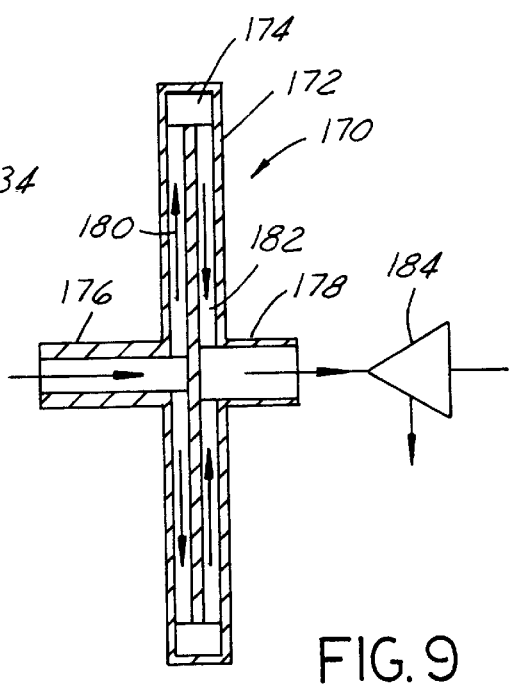
FIG. 9

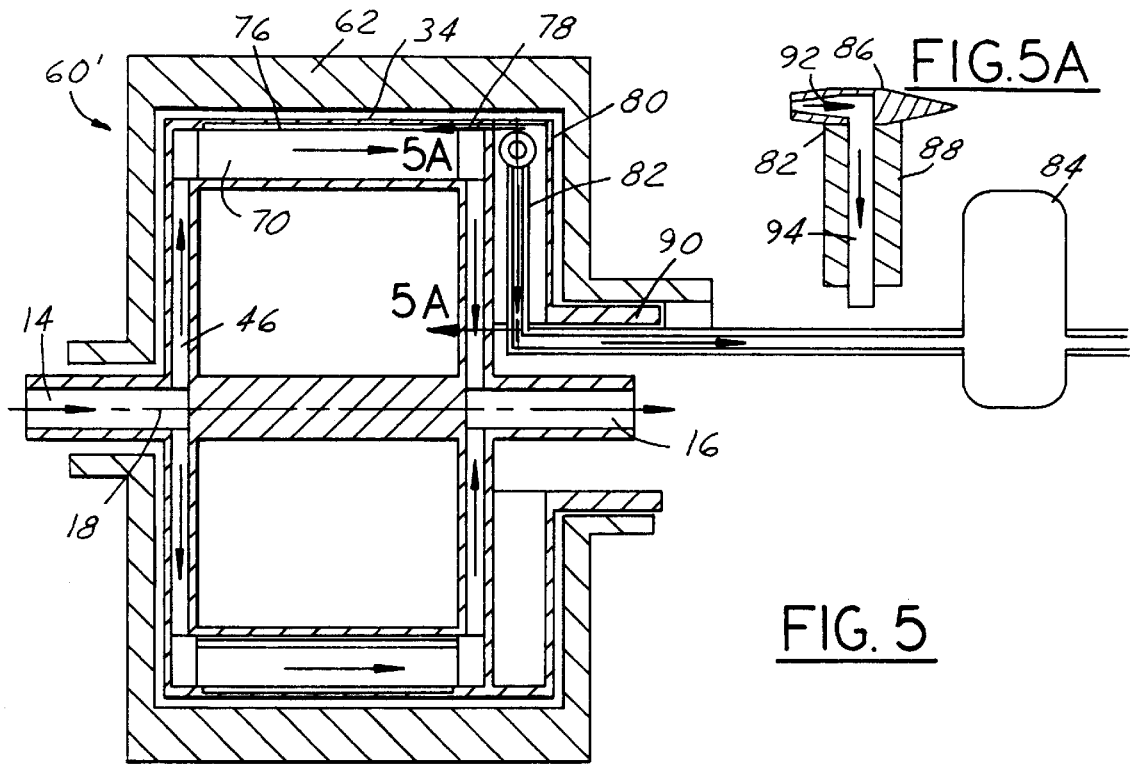
FIG. 5
FIG. 5A
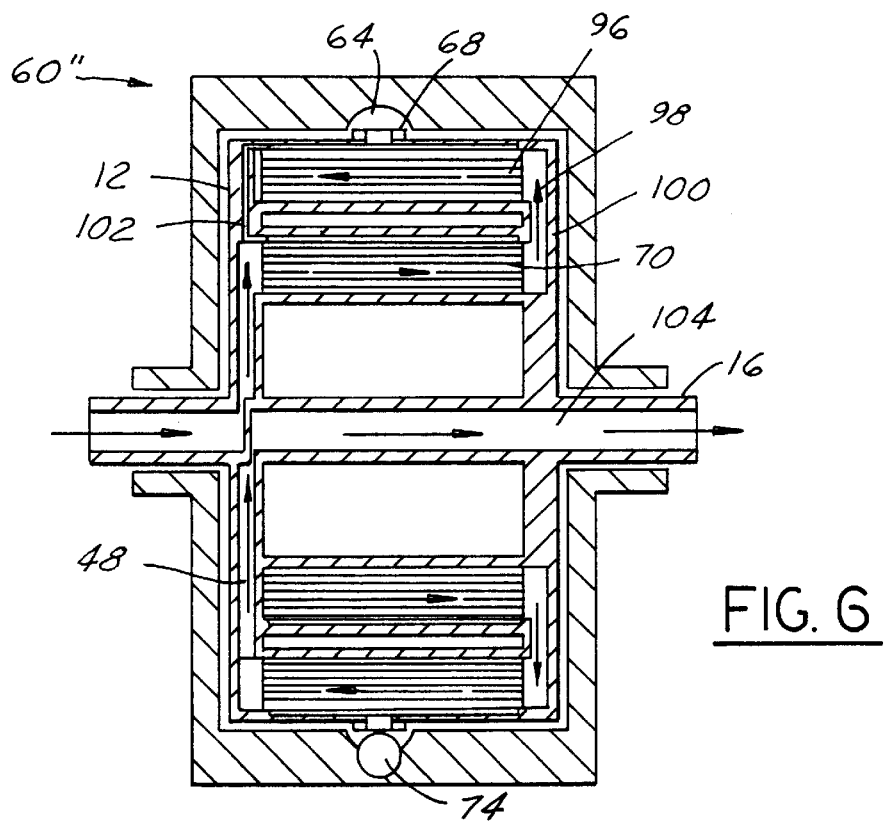
FIG. 6

ROTATING PROCESS CHAMBER WITH INTEGRAL PUMP AND ENERGY RECOVERY TURBINE

RELATED APPLICATION

The present application claims priority to provisional U.S. patent application Ser. No. 60/117,286 filed on Jan. 26, 1999, which is hereby incorporated by reference.

TECHNICAL FIELD

The present invention relates generally to a pressurized process chambers for performing various industrial processes, and more specifically, to a process chamber having an integral turbine and pump therein.

BACKGROUND OF THE INVENTION

Various industrial processes require the use of high pressures for the fluids used in the processes. The liquids may include gasses used for chemical reactions such as natural gas purification or liquids such as those used in various chemical processes. These processes may also include reverse osmosis desalinization of ocean water to produce drinking water, wet oxidation, centrifugal separation and catalytic cracking of hydrocarbons.

As the cost of energy continues to rise, engineers increasingly search for ways in which to reduce the overall power consumption in industrial processes. Oftentimes, the industrial processes that employ high pressure fluid require that the output of the process eventually returns to ambient pressure. To reduce the pressure of the output fluid, typically a multitude of piping and valves are employed. The piping and valves increase the cost of the overall process and increase the maintenance costs of such a system.

Various means have been employed to recover energy from the discharge of such processes. Examples of known energy recovery devices include turbines and positive displacement pumps. Oftentimes, these energy recovery devices are expensive to manufacture and maintain, have high installation costs, and are not very reliable. Further, such systems are not capable of regulating the pressure and flow rates of the fluid streams. For various processes, regulation of the flow rates and pressures is important.

It would therefore be desirable to provide a process chamber capable of reducing the overall energy consumption of a known processes as well as reducing the drawbacks of the prior art outlined above.

SUMMARY OF THE INVENTION

It is therefore one object of the invention to provide process chamber that may be integrated easily into standard processes to reduce the overall energy consumption of the processes. Consequently, certain equipment cost savings due to a reduction in pump sizes may also be achieved.

In one aspect of the invention, a rotating process chamber assembly comprises a substantially cylindrical process chamber has an outer wall extending between two end walls and a substantially cylindrical inner wall spaced radially inward from the outer wall in an axial direction. The outer wall and the inner wall define an annular reaction space therebetween. The housing has a central axis. The process chamber has an inlet located substantially coaxial with the central axial. The process chamber has an outlet located substantially axial with the central axis. A drive is coupled to the process chamber to rotate the housing about the central axis. A plurality of feed channels fluidically couples the inlet and the annular reaction space. A first plurality of product channels fluidically couples the annular reaction space to the outlet.

In a further aspect of the invention, a reverse osmosis system comprises a stationary housing and a substantially cylindrical process chamber coupled within the stationary housing. The process chamber has an outer wall extending between two end walls and a substantially cylindrical inner wall spaced radially inward from the outer wall in an axial direction. The outer wall and the inner wall define an annular reaction space therebetween. The housing has a central axis. The process chamber has an inlet located substantially coaxial with the central axial for introducing feed fluid into the process chamber. A membrane is disposed within the process chamber for separating the feed fluid into permeate and concentrate. The process chamber has an outlet located substantially coaxially with the central axis. A drive is coupled to the process chamber and rotates the housing about the axis. A plurality of feed channels fluidically couples the inlet and the annular reaction space. A first plurality of product channels fluidically couples the annular reaction space to the outlet.

One advantage of the invention is that because the pressure of the system can be adjusted by the rotation a high range of pressures are available using a relatively small amount of energy.

Another advantage of the system is that the pressurization and depressurization are nearly 100 percent efficient even at low flow rates. This in contrast to known processes employing pumps that are inefficient at low flows.

Other objects and features of the present invention will become apparent when viewed in light of the detailed description of the preferred embodiment when taken in conjunction with the attached drawings and appended claims.

BRIEF DESCRIPTION OF THE INVENTION

FIG. 3A is a schematic view of an implementation of a rotating process chamber within a process.

FIG. 3B is a schematic view of a rotating process chamber having some product fed back into the inlet of the rotating process chamber.

FIG. 4 is a cross-sectional view of a reverse osmosis system using a process chamber according to the present invention.

FIG. 4A is a cross-sectional along line 4A—4A of FIG. 4 through a pickup tube.

FIG. 5 is a cross-sectional view of an alternative reverse osmosis system using a rotating process chamber according to the present invention.

FIG. 5A is a cross-sectional view along line 5A–5A of FIG. 5 of a pitot tube.

FIG. 6 is a cross-sectional view of yet another reverse osmosis system having a two-stage membrane according to the present invention.

FIG. 9 is a cross-sectional view of a hot gas generator having a process chamber according to the present invention.

DETAILED DESCRIPTION OF THE PREFERRED EMBODIMENT

In the following figures, the same references numerals will be used to identify identical components in the various views.

The present invention is described with respect to various preferred embodiments and preferred system uses for the rotating process chamber of the present invention. One skilled in the art would recognize various alternatives without varying from the spirit of the invention.

Figure 1:
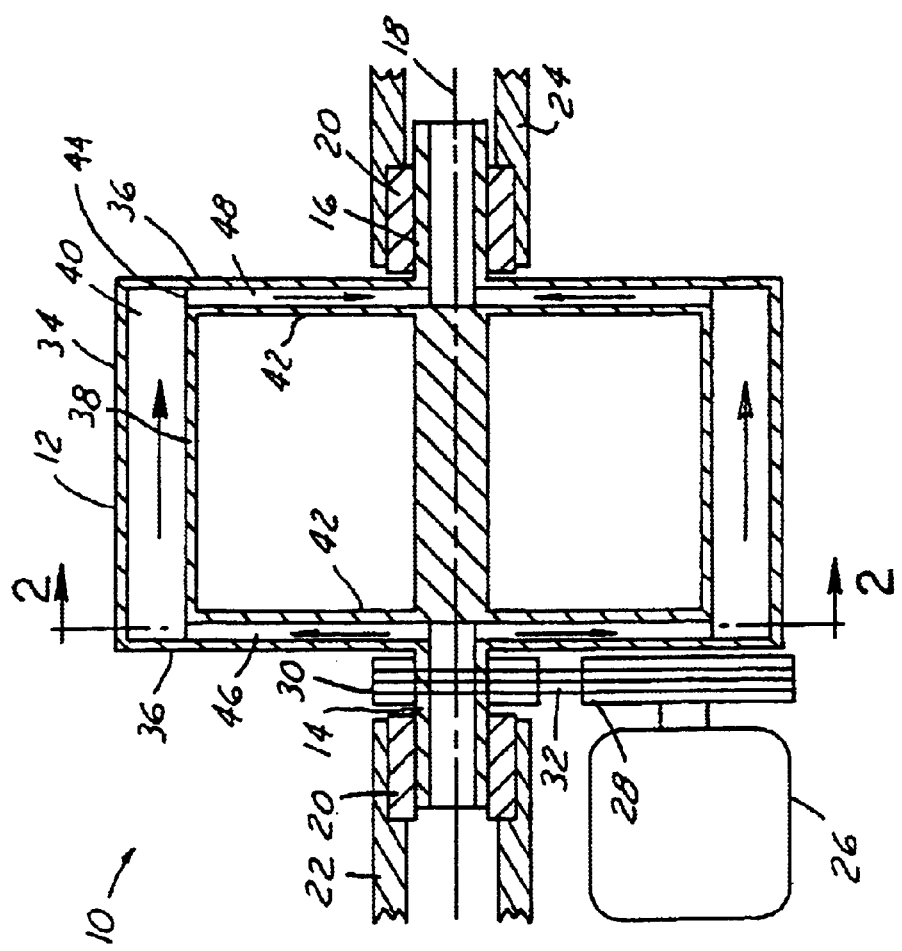
FIG. 1 is a longitudinal cross-sectional view of a rotating process chamber according to the present invention.

Referring now to FIG. 1, a processing system 10 has a rotating process chamber 12 that has a fluid inlet 14 and a fluid outlet 16. The rotating process chamber 12 has an axis of rotation 18. Preferably, inlet 14 and outlet 16 are located coaxially with axis 18. A sleeve bearing 20 is located on inlet 14 and outlet 16. Sleeve bearing 20 provides rotational movement between inlet fluid conduit 22 and outlet fluid conduit 24, respectively.

A drive motor 26 is used to provide rotational movement of rotating process chamber 12. Motor 26 has a pulley 28 coupled thereto. Inlet 14 also has a pulley 30 coupled thereto. A belt 32 extends between pulley 28 and pulley 30 so that as pulley 28 is rotated, belt 32 causes the rotation of pulley 30 and thus rotating process chamber 12. Of course, those skilled in the art would recognize that other drive arrangements may be used to rotate process chamber 12.

The outer periphery of process chamber 12 is generally defined by a cylindrical outer wall 34 and a pair of generally circular shaped end walls 36. Outer wall 34 extends between end walls 36. Process chamber 12 has an annular shaped inner wall 38 spaced radially from outer wall 34. Thus, outer wall 34 and inner wall 38 defines an annular reaction space therebetween. The radius of inner wall 38 is less than the radius of outer wall from axis 18. Inner walls 38 may be supported by inner end walls 42. Inner end walls 42 are supported by an axial support 44. Inner end walls 42 are spaced apart from end walls 36 to define feed channels 46 that fluidically couple inlet 14 to annular reaction space 40. End walls 36 and inner end walls 42 also define product channels 48 that fluidically couple annular reaction space 40 with outlet 16.

Figure 2:
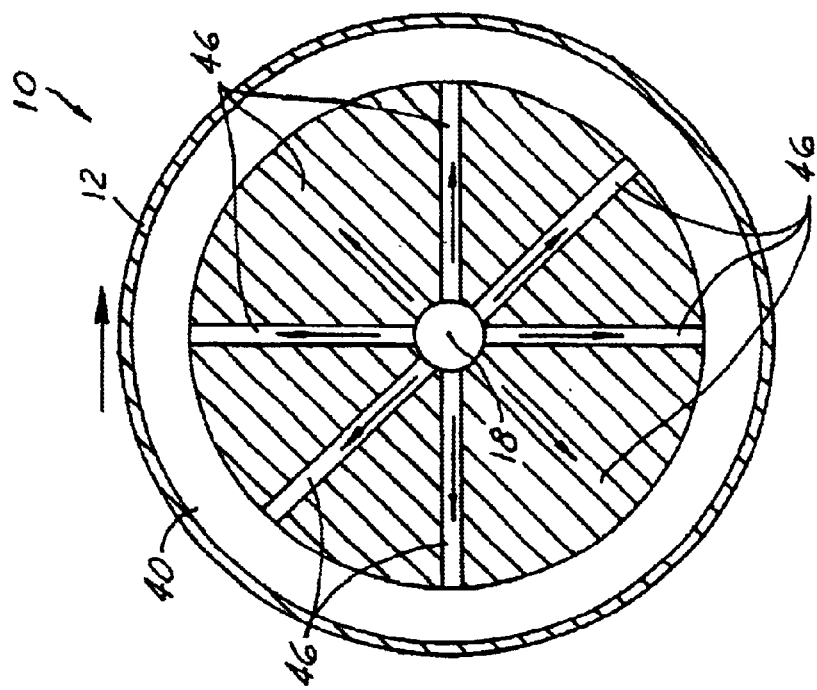
FIG. 2 is a cross-sectional view along line 2—2 illustrating feed channels of the rotating process chamber.

Referring now also to FIG. 2, feed channels 46 in a preferred embodiment are illustrated. Feed channels 46 fluidically couple inlet 14 to annular reaction space 40. As shown, eight radially-disposed feed channels are illustrated. However, various numbers of feed channels 46 may be provided depending on the diameter of the feed channels 46 and the desired flow rate of the sum of feed channels 46. Preferably, feed channels 46 are equally spaced so that a rotationally balanced system is obtained.

The cross-sectional view shown in FIG. 2 is also similar to a cross-section through product channels 48. However, in such a case, product flows from annular reaction space 40 toward the outlet located at the center which is opposite to that shown in FIG. 2.

As illustrated, inner end walls 42 and end walls 36 define feed channels 46 and product channels 48. However, a solid wall having either feed channels or product channels therein may also be implemented. Of course, various other implementations for feed channels 46 and product channels 48 will be evident to those skilled in the art.

In operation, motor 26 through pulleys 28, 30 and belt 32 rotate process chamber 12 at a desired speed of rotation. Feed enters inlet 14 which is in fluid communication with feed channels 46. Fluid enters feed channel 46 and is forced radially outward toward annular reaction space 40. The rotational motion on the feed fluid generates a centrifugal force resulting in an increase in fluid pressure. The high pressure fluid enters annual reaction space 40 where a desired reaction or fluid separation may occur at the elevated pressure. A product is formed in annular reaction space 40 and is removed from reaction space 40 by product channels 48. The principles of the conservation of angular momentum are present within process chamber 12. That is, the force of the fluid within feed channels 46 must equal the force on the product within product channels 48. Thus, the two forces cancel out resulting in a zero net torque requirement to maintain rotation regardless of the flow rate or the degree of pressurization in annular reaction space 40 of process chamber 12.

In practice, however, frictional drag of bearings 20, windage drag from the rotation of process chamber 12, and residual tangential velocity of the product stream exiting outlet 16 requires that some added energy be added to maintain the rotation of rotating process chamber 12. The amount of energy is only a few percent of the energy required if pressurization was provided solely by a pump.

The hydraulic performance of rotating process chamber 12 is different than a conventional pump system. First, the process pressure in rotating process chamber 12 may be easily adjusted by changing the rotation rate. That is, by changing the drive motor speed 26, the rotation rate may be easily changed. Because rotation of rotating process chamber 12 takes little energy, a wide pressure range may be obtained with little expenditure of energy. Another advantage of the system is that the flow rate of the rotating process chamber may be widely varied with little expenditure of energy. An increase in boost pressure, for example, from 5 to 20 psi may double the flow rate. This is possible even if the process chamber is at several thousand psi. Efficiency is maintained at nearly 100 percent even with high pressure differentials and very low flow rates. In contrast, conventional systems using pumps have high efficiency losses at low flow rates and high pressures.

Referring now to FIG. 3A, the flow rate of process chamber 12 is dictated mostly by frictional flow resistance of feed channels 46 and product channels 48. A booster pump 50 may be added along with a control valve 52 in the inlet stream. The level of pressurization of the feed entering process chamber 12 determines the flow rate through annular reaction space 40. Booster pump 50 need only be small compared to feed pumps of the prior art. The pressure losses in rotating process chamber are relatively small when handling fluid such as water. Booster pump 50 therefore should be capable of handling such losses which are typically on the order of 5 to 20 psi. Regulation of booster pump 50 is provided by control valve 52 which may, for example, be comprised of a throttle valve or other known means to regulate fluid pressure.

Referring now to FIG. 3B, in some applications, it may be desirable to reprocess a portion of the product stream. A pump 50 is coupled to inlet 14. A pipe 54 is coupled between outlet 16 and pump 50. A first control valve 56 is coupled into pipe 50 to control the flow from outlet 16 to pump 50. A second valve 53 may be used to create sufficient back pressure to drive fluid from inlet 16 to pump 50.

Referring now to FIG. 4, a second embodiment of a rotating process chamber 12 illustrating a reverse osmosis system 60 is illustrated. In reverse osmosis system 60, the feed stream is separated ultimately into two streams; a permeate stream that is essentially pure fluid and a concentrate stream, often called a brine stream, that contains dissolved solids from the feed stream. System 60 may be driven in a similar manner to that shown in FIG. 1. However, for simplicity, the drive motor, pulleys and belt are not shown.

In this embodiment, rotating process chamber 12 is placed within a stationary housing 62. Housing 62 has a circular groove 64 therearound. Circular groove 64 is fluidically coupled to a pickup tube 66. Pickup tube 66 as will be further described below is used to drain purified liquid from housing 62.

Outer cylindrical wall 34 of FIG. 4 has been modified from that in FIG. 1. A drain port 68 adjacent to circular groove 64 is provided therethrough. Drain port 68 allows purified fluid to be removed from within annular reaction space 40 of process chamber 12.

To separate the fluid into permeate and concentrate, a membrane 70 is provided within annular reaction space 40. Membrane 70 may, for example, consist of several membrane sheets wrapped in a spiral configuration about inner wall 38. In operation, fluid to be purified enters inlet 14 and flows outward through feed channels 46. Fluid enters membrane 70 where some of the fluid flows outwardly due to centrifugal force through membrane 70 and out through drain port 68. The purified fluid flows into circular groove 64 where it may be removed through pickup tube 66. Concentrate exits annual reaction space 40 through product channels 48. Fluid from product channels 48 exit rotating process chamber 12 through outlet 16.

Referring now to FIG. 4A, permeate leaving rotating process chamber 12 has a relatively high velocity within circular groove 64. A pickup tube 72 having a constant flow area in series with a diffuser 74 may be used to receive the permeate fluid. Diffuser portion 74 preferably has a conical shape that converts a portion of the velocity energy of the permeate stream into a static pressure.

Referring now to FIGS. 5 and 5A, a second embodiment of a reverse osmosis system 60' is illustrated. In this embodiment, the manner in which permeate fluid is removed has been changed from that described above in connection with reverse osmosis system 60. In this embodiment, circular groove 64 and pickup tube 66 have been removed. A collection tube 76 is positioned within annular reaction space 40 of rotating process chamber 12. Collection tube 76 is in fluid communication with a transfer tube 78 that is coupled to a permeate housing 80. Permeate housing 80 is preferably integrally formed with rotating process chamber 12. Permeate housing 80 therefore rotates with rotating process chamber 12.

A pitot tube 82 is located within permeate housing 80. Pitot tube 82 is fluidically coupled to permeate tank 84. Pitot tube 82 transfers permeate from within permeate housing 80 to permeate tank 84. As is best shown in FIG. 5A, pitot tube 82 has a pick up head 86 and a strut 88. Strut 88 is rigidly coupled to housing 62 by a plate 90.

Pick up head 86 has a conical shaped diffusion portion 92 that is reverse conical in shape. That is, the entrance of diffusion portion 92 has a smaller diameter than the portion of diffusion portion 92 closest to a discharge passage 94 within pitot tube 82.

In operation, fluid flows into process chamber 12 through feed channel 46. The fluid is processed through membrane 70 where it is converted into permeate fluid that, through centrifugal motion, collects in collection tube 76. Concentrate is removed from the system through outlet 16. Permeate is transferred through transfer tube 78 into permeate housing 80. Because of centrifugal motion, permeate remains biased against outer wall 34 within permeate housing 80. The high velocity permeate enters pick up head 86 which remains stationary. The permeate velocity is reduced within pick up head 86 and the static pressure is increased as permeate passes through diffusion portion 92. Permeate is removed from the housing 80 through discharge passage 94 and is stored within permeate tank 84.

In this embodiment, automatic control of permeate production may be obtained. For example, if no permeate is removed from permeate tank 84, then the depth of permeate fluid within permeate tank 84 will continue to increase toward the axis 18. The permeate pressure within permeate housing 80 is communicated to membrane 70 by transfer tube 78. At some point, the permeate pressure will be roughly equal to the feed pressure in membrane 70. At that point, no additional permeate is created and there is no differential pressure across membrane 70. When permeate is withdrawn from permeate tank 84, the permeate depth within permeate housing 80 will be reduced. This decreases the permeate pressure imposed on membrane 70. Membrane thus will begin to produce permeate until the permeate depth of permeate housing 80 increases to meet the equilibrium point described above. Advantageously, rotating process chamber 12 need never be shut down. When no permeate is being produced, energy consumption of rotating process chamber 12 is very small since no angular momentum is lost and drag losses are negligible.

By selecting the proper size of permeate tank 84, a reduced amount of salt entering permeate tank 84 may be sufficiently diluted. During periods when little or no permeate is being produced, permeate within membrane 70 tends to become salty due to salt passage through membrane 70. When permeate is drawn into permeate tank 84, a small amount will be relatively salty. Thus, if permeate tank 84 is sized large enough, an acceptable overall salt level in permeate tank 84 may be maintained. Typically, permeate tank 84 should have an internal volume of about five times the volume of membrane 70.

It should be noted that permeate in the above systems does not return to the center of rotation and therefore its angular momentum is lost from rotating process chamber 12. To maintain angular momentum lost by the permeate, the drive motor 26 shown above must provide the additional energy.

Referring now to FIG. 6, feed may be pressured to an intermediate level and then the feed will be passed through a membrane. In this embodiment of a reverse osmosis system 60", a second membrane 96 is incorporated into rotating process chamber 12. In this embodiment, each membrane 70, 96 may be pressured to a respective different pressure due to the rotational movement of rotating process chamber 12. That is, membrane 96 is at a higher pressure than membrane 70. An intermediate wall 98 may be positioned between first membrane 70 and second membrane 96. Wall 98 has an opening 100 to define a fluid passage between first membrane 70 and second membrane 96.

In this embodiment, feed enters membrane 70 and permeate is extracted through a permeate channel 102. Permeate channel 102 is coupled to drain port 68. The remaining concentrated feed solution passes through opening 100 and enters second membrane 96. The permeate now at a higher pressure permeates through second membrane 96 and leaves process chamber 12 through drain port 68. The additional tangential velocity applied to the fluid from membrane 70 as it enters second membrane 96 is desirable for efficient operation of the membrane handling feed with a higher concentration of dissolved solids. In both cases, permeate is collected by circular groove 64. The concentrated stream exiting second membrane 96 leaves rotating process chamber through product channels 48 coupled to an axial central channel 104. Central channel 104 is coupled to outlet 16.

The velocity energy of the permeate is lost except for the amount recovered through diffuser 74. This, however, is minimal and a highly efficient action of pumping and energy recovery of the concentrate stream renders the overall efficiency much higher than other methods of reverse osmosis.

Figure 7:
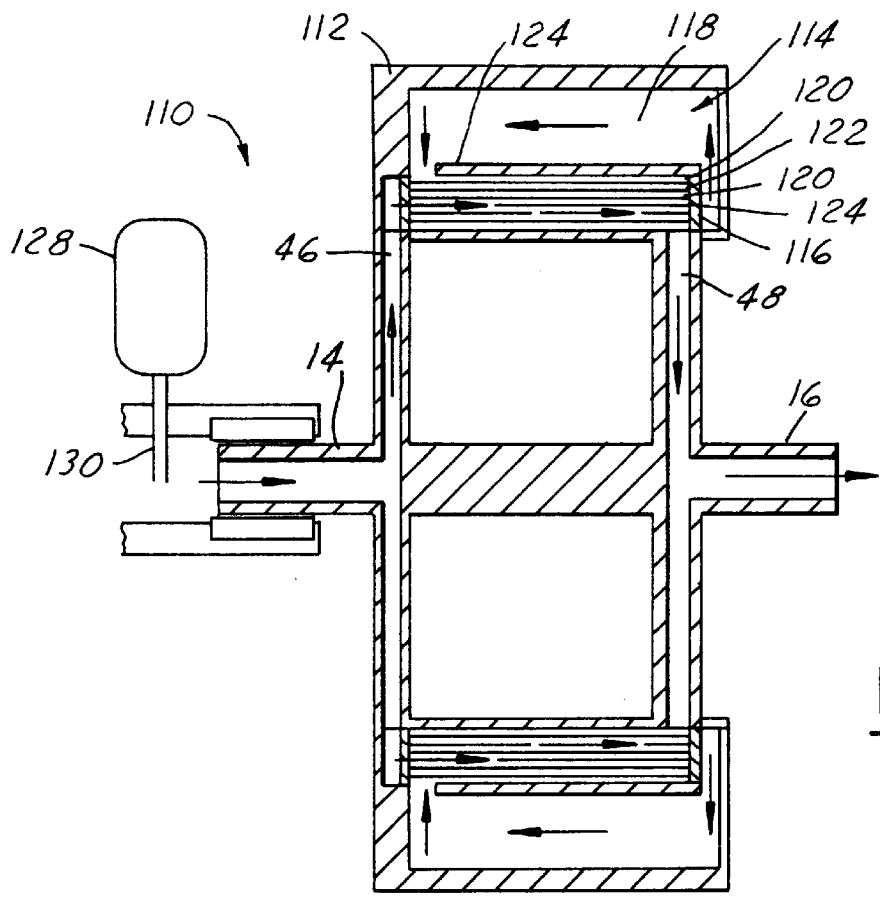
FIG. 7 is a cross-sectional view of a wet oxidation system using a process chamber according to the present invention.

Referring now FIG. 7, the teachings of the present invention may also be applied to a wet oxidation system. In a wet oxidation system organic pollutants are rendered into harmless substances. Such processes typically require the mixing of pollutants with oxygen and water. The mixture is heated and pressurized to a level above the critical point of water (about 705° F. and 3208 psig). The oxygen oxidizes the pollutants into harmless substances. Those skilled in the art would also recognize that this process is sometimes called a supercritical wet oxidation system. In prior art systems, wet oxidation systems employ a pump used to pump contaminated feed into a process chamber. Prior to the admission of the fluid, a heater adds heat to the feed. Also, it is common for a heat exchanger to be used that is coupled to the process chamber to increase the heat in the feed fluid. This process is very energy intensive due to the heat that must be added as well as the high pressure pump.

Wet oxidation system 110 includes a modified rotating process chamber 112. Rotating process chamber 112 has feed channels 46 and product channels 48 similar to that shown above. Rotating process chamber 112 has an annular reaction space 114 that is comprised of a heat exchanger portion 116 and an oxidation portion 118 spaced radially from the heat exchanger portion 116. Heat exchanger portion 116 is comprised of a plurality of tubes 120 that are fluidically coupled to feed inlet 48. Spaces 122 are left between tubes 120. A wall 124 may be used to separate annular reaction space into the heat exchanger portion 116 and the oxidation portion 118. Wall 124 may also be used for supporting tubes 120. Tubes 120 thus extend between feed channel 46 and a radial portion 126 of wall 124.

Wet oxidation system 110 includes an oxygen reservoir 128. Oxygen reservoir 128 is coupled to inlet 14 through an injector 130. As will be further described below, oxygen reservoir 128 and injector 130 may be optional.

In operation, fluid to be purified is coupled to process chamber 112 through inlet 14. The feed fluid enters feed inlet 46 where it flows radially outward and enters tubes 120 that are axially disposed. The feed travels through the tubes and into oxidation portion 118 where the condition for a reaction between oxygen and the contaminants within the feed fluid are favorable. The processed fluid flows radially inward into heat exchanger portion 116 into spaces 122 between tubes 120. The process fluid is at an elevated temperature and transfers heat into the incoming feed within tubes 120. The process feed travels through product channels 48 and out of rotating process chamber 112 through outlet 16.

It is important that the heat transfer process occur at a high pressure such as that that may be developed within annular reaction space 114. The high pressure will suppress boiling of the fluids and promote high heat transfer efficiency. Also, formation of vapor bubbles which can be adverse to the dynamic balance of the rotating process chamber 112 may be suppressed. If vapor bubbles form, undesirable vibration of rotating process chamber 112 may be manifested. In the above process, oxygen may be provided to oxidation portion 118 directly. However, in some processes oxygen reservoir 128 and injector 130 may be used to inject fine bubbles uniformly within the feed stream before the fluid passes into inlet port 14. The oxygen bubbles carried with the feed through channels 46 are compressing the oxygen bubble as the feed pressure increases. Thus, the oxygen is supplied at an increased pressure.

Figure 8:
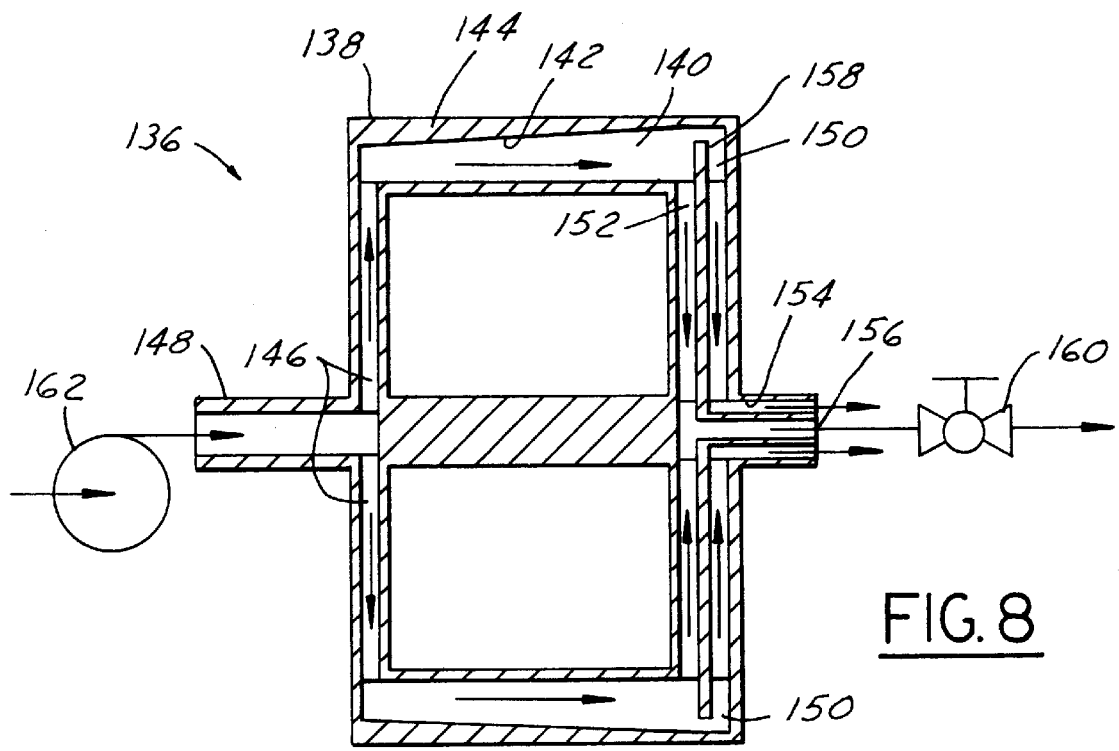
FIG. 8 is a cross-sectional view of a centrifugal separator having a reverse osmosis system according to the present invention.

Referring now to FIG. 8, the teachings of the present invention may also be applied to a centrifugal separator 136. Centrifugal separator 136 may, for example, be used to separate a multi-phase liquid. Rotating process chamber 136 has an annular reaction space 40 similar to that shown in FIG. 1. However, annular reaction space 140 has an angled inner surface 142 of outer wall 144. Thus inner surface is conical in shape. Feed channels 146 couple inlet 148 to annular reaction space 140. The surface of outer wall 142 is such that the diameter of the inlet end of annular reaction space 140 is less than the outlet end. In this embodiment, a pair of sets of product channels 150 and 152 are provided. Product channels 150 have an opening near surface 142. Product channels 150 extend to a first outlet 154. Product channel 152 has an opening at a diameter less than the opening of product channel 150. Thus, a wall 158 separates product channel 150 and product channel 152. Product channel 152 is in fluid communication with second outlet 156. Outlet 154 is fluidically isolated from second outlet 156 so that the two outlet streams do not mix.

In operation, the centrifugal force provided by the rotation of rotating process chamber 138 moves heavier components within the feed fluid toward the surface 142 of outer wall 144. The heavier components travel along surface 142 toward product channels 150. A valve 160 and pump 162 may be used to regulate the flow into rotating process chamber 138 and out of first outlet 154 and second outlet 156. Adjustment of valve 160 and pump 162 may be used to provide close control over the rate of separation of the feed stream.

Referring now to FIG. 9, a pressurized hot gas generator 170 is illustrated having a rotating process chamber 172. A hot gas generator, for example, may be used as a gassifier in a gas turbine. In this embodiment, process chamber 172 has an annular combustion chamber 174. Process chamber 172 has an inlet 176 and an outlet 178 similar to those described above. Feed channels 180 couple inlet 176 to combustion chamber 174. Product Is channels 182 couple combustion chamber 174 to outlet 178. Outlet 178 may also be fluidically coupled to a power recovery turbine 184.

In operation, air enters through inlet 176 and travels through feed channels 180 into combustion chamber 174. The air is compressed by centrifugal force generated by the rotation of process chamber 172. Fuel is mixed with the air in combustion chamber 174 where it is ignited. The hot gasses pass radially inward through product channels 182. Because the hot gasses in product channel 182 have a much lower density than the feed air within feed channel 180, the pressure drop through channels 182 is much less. Thus, the hot gasses will have a considerable pressure at outlet 178. The hot gasses may be directed to power recovery turbine 184 to recover the remaining available energy in the form mechanical shaft output. Feed channel 180 and product channel 182 are preferably placed in close proximity so that feed channels 180 will cool the heated product channels 182. This improves thermal efficiency. The simplicity of design may also allow process chamber 172 to be constructed of ceramic which has a high temperature resistance.

The hot gas generator 170 is advantageous to conventional gas turbines because the pressure in the combustion chamber 174 may be varied widely by changing the rotation rate of process chamber 172 without a loss of efficiency. The flow rate through rotating process chamber 172 may also be widely varied by the use of an external blower (not shown) connected to inlet 176. The mass flow rate and combustion chamber pressure can also be independently varied over a wide range without loss of efficiency.

While particular embodiments of the invention have been shown and described, numerous variations and alternate embodiments will occur to those skilled in the art. Accordingly, it is intended that the invention be limited only in terms of the appended claims.

What is claimed is:

1. A rotating process chamber assembly comprising:
    a substantially cylindrical process chamber having an outer wall extending between two end walls and a substantially cylindrical inner wall spaced radially inward from said outer wall in an axial direction, said outer wall and said inner wall defining an annular reaction space therebetween, said housing having a central axis;
    said process chamber having an inlet located substantially coaxial with said central axis; and
    said process chamber having an outlet located substantially axial with said central axis;
    a drive coupled to said process chamber rotating said housing about said axis;
    a plurality of feed channels fluidically coupling said inlet and said annular reaction space; and
    a first plurality of product channels fluidically coupling said annular reaction space to said outlet.

2. An assembly as recited in claim 1 wherein said feed channels extend radially between said inlet and said annular reaction space.

3. An assembly as recited in claim 1 wherein said product channels extend radially between said outlet and said annular reaction space.

4. An assembly as recited in claim 1 further comprising a booster pump coupled to said inlet.

5. An assembly as recited in claim 4 further comprising a control valve coupled between said booster pump and said inlet.

6. An assembly as recited in claim 4 further comprising a first valve coupled between said outlet and said pump.

7. An assembly as recited in claim 6 further comprising a second valve coupled to said outlet for regulating product from the outlet.

8. An assembly as recited in claim 1 further comprising a stationary housing substantially enclosing said process chamber.

9. An assembly as recited in claim 1 wherein said stationary housing comprises a circular groove and a pick up tube extending between an interior of said housing and an exterior of said housing, said pickup tube fluidically coupled to said circular groove.

10. An assembly as recited in claim 9 further comprising a drain port coupled through said outer wall, said drain port adjacent to said circular groove.

11. An assembly as recited in claim 1 wherein said annular reaction space comprises an oxidation portion and a heat exchanger portion, said heat exchanger portion comprising a plurality of tubes fluidically coupling said feed channels to said oxidation portion, said plurality of tubes having a space therebetween said space fluidically coupling said oxidation portion to said product channels.

12. An assembly as recited in claim 1 further comprising a second plurality of product channels and a second outlet, said second product channels extending between said outer wall and said second outlet.

13. An assembly as recited in claim 1 wherein said outer wall is conical in shape having a first diameter adjacent to said feed channels less than a second diameter adjacent to said second product channel.

14. A centrifugal separator having a process chamber as recited in claim 13 further comprising a pump coupled to said inlet and a control valve coupled to said outlet.

15. An assembly as recited in claim 1 wherein said product channels are located adjacent said feed channels.

16. An assembly as recited in claim 1 wherein said drive comprises a first pulley coupled to said process chamber and a second pulley coupled to a motor.

17. A rotating process chamber assembly comprising:
    a substantially cylindrical process chamber having an outer wall extending between two end walls and a substantially cylindrical inner wall spaced radially inward from said outer wall in an axial direction, said outer wall and said inner wall defining an annular reaction space therebetween, said housing having a central axis;
    said process chamber having an inlet located substantially coaxial with said central axis; and
    said process chamber having an outlet located substantially axial with said central axis;
    a motor rotatably coupled to said process chamber rotating said housing about said axis;
    a plurality of teed channels fluidically coupling said inlet and said annular reaction space, said feed channels radially disposed one of said end walls; and
    a first plurality of product channels fluidically coupling said annular reaction space to said outlet, said product channels radially disposed one of said end walls.

* * * * *